US012522717B2

(12) United States Patent
Hart-Cooper et al.

(10) Patent No.: US 12,522,717 B2
(45) Date of Patent: Jan. 13, 2026

(54) NATURAL PACKAGING COMPOSITION

(71) Applicants: The United States of America, as Represented by the Secretary of Agriculture, Washington, DC (US); Method Products, PBC, San Francisco, CA (US)

(72) Inventors: William M Hart-Cooper, Richmond, CA (US); William J Orts, Burlingame, CA (US); Julia C Cunniffe, Oakland, CA (US); Nabeel N Kalla, Berkeley, CA (US); Lennard C Torres, Dublin, CA (US); Kaj Johnson, Sausalito, CA (US); Dirk Develter, Maldegem (BE)

(73) Assignees: The United States of America, as Represented by the Secretary of Agriculture, Washington, DC (US); Method Products, PBC, San Francisco, CA (US)

( * ) Notice: Subject to any disclaimer, the term of this patent is extended or adjusted under 35 U.S.C. 154(b) by 508 days.

(21) Appl. No.: 17/105,377

(22) Filed: Nov. 25, 2020

(65) Prior Publication Data

US 2021/0155777 A1    May 27, 2021

Related U.S. Application Data

(60) Provisional application No. 62/941,015, filed on Nov. 27, 2019.

(51) Int. Cl.
*C08L 5/00* (2006.01)
*C08J 3/20* (2006.01)

(52) U.S. Cl.
CPC .  *C08L 5/00* (2013.01); *C08J 3/20* (2013.01); *C08J 2305/00* (2013.01);
(Continued)

(58) Field of Classification Search
None
See application file for complete search history.

(56) References Cited

U.S. PATENT DOCUMENTS 5,112,688 A * 5/1992 Michael ............... D06M 23/12
510/516
5,470,382 A * 11/1995 Andou .................... B29C 67/24
106/125.1
(Continued)

FOREIGN PATENT DOCUMENTS

CN    101489404 A    7/2009
CN    102731841      10/2012
(Continued)

OTHER PUBLICATIONS

WO-2008028278-A1, English translation (Year: 2008).*
(Continued)

*Primary Examiner* — Stefanie J Cohen
(74) *Attorney, Agent, or Firm* — John Fado; John Henri (57) ABSTRACT

A packaging material composition may be biodegradable and water-soluble. The packaging material may include a biodegradable nonionic polysaccharide, a biodegradable ionic polysaccharide, and a plasticizer. Optionally, additional components may be added to the packaging material for a desired purpose. Additional components may include a biocide, clay, metal oxides (i.e. titanium dioxide and zinc oxide), modified nanoclays, one or more crosslinkers, other functional agents, and residual solvent from the packaging material production process.

16 Claims, 4 Drawing Sheets (52) U.S. Cl.
CPC ........ *C08J 2401/02* (2013.01); *C08J 2405/00* (2013.01); *C08J 2405/04* (2013.01); *C08L 2201/06* (2013.01); *C08L 2203/16* (2013.01); *C08L 2205/025* (2013.01)

(56) References Cited

U.S. PATENT DOCUMENTS

| | | | |
|---|---|---|---|
| 7,749,538 B2 | 7/2010 | Sugimoto et al. | |
| 9,931,305 B2 | 4/2018 | Yang et al. | |
| 10,829,621 B2 | 11/2020 | Lee et al. | |
| 2004/0043134 A1 | 3/2004 | Corriveau et al. | |
| 2004/0096569 A1 | 5/2004 | Barkalow et al. | |
| 2004/0115137 A1* | 6/2004 | Verrall | A61K 8/73 424/48 |
| 2005/0208108 A1* | 9/2005 | Jannusch | A61K 9/0056 424/443 |
| 2006/0024425 A1 | 2/2006 | Barkalow et al. | |
| 2007/0087939 A1 | 4/2007 | Cade et al. | |
| 2007/0264487 A1 | 11/2007 | Georgiades | |
| 2007/0292481 A1 | 12/2007 | Hoffman et al. | |
| 2008/0152761 A1* | 6/2008 | Shen | A23L 2/395 426/582 |
| 2009/0011115 A1 | 1/2009 | Foss et al. | |
| 2009/0104314 A1* | 4/2009 | Dellinger | A21B 3/13 426/138 |
| 2009/0162516 A1 | 6/2009 | Brown et al. | |
| 2011/0229698 A1* | 9/2011 | Rasmussen | C08L 91/06 156/267 |
| 2016/0039591 A1* | 2/2016 | Kinzer | A61K 31/616 206/459.1 |
| 2016/0102279 A1* | 4/2016 | Labeque | C08K 5/053 510/513 |
| 2016/0230342 A1* | 8/2016 | Müller | D21H 19/54 |
| 2016/0256384 A1* | 9/2016 | Buydts | G16H 20/13 |
| 2016/0280869 A1* | 9/2016 | Nii | C08K 5/0016 |
| 2017/0000179 A1* | 1/2017 | Cheng | A61B 5/073 |
| 2017/0259976 A1 | 9/2017 | Lee et al. | |
| 2019/0248989 A1* | 8/2019 | Raszewski | C08L 5/06 |
| 2021/0032002 A1 | 2/2021 | Miranda et al. | |
| 2021/0087365 A1 | 3/2021 | Lee et al. | |

FOREIGN PATENT DOCUMENTS

| | | | | |
|---|---|---|---|---|
| CN | 102731841 A | | 10/2012 | |
| EP | 1072633 A1 | | 1/2001 | |
| JP | 2001279016 A | | 10/2001 | |
| JP | 2003125714 A | | 5/2003 | |
| JP | 2009539719 A | | 11/2009 | |
| JP | 2014185177 A | | 10/2014 | |
| JP | 2018057344 A | * | 4/2018 | |
| KR | 2004-0002385 | | 1/2004 | |
| KR | 2009-0034882 | | 4/2009 | |
| TW | 1304424 B | | 12/2008 | |
| TW | I304424 B | | 12/2008 | |
| WO | 2002/088246 A1 | | 11/2002 | |
| WO | WO-2004078807 A2 | * | 9/2004 | ........... C08F 251/00 |
| WO | 2004/112504 A1 | | 12/2004 | |
| WO | 0226117801 A2 | | 11/2006 | |
| WO | 2007149276 A2 | | 12/2007 | |
| WO | WO-2008028278 A1 | * | 3/2008 | ........... A01N 25/10 |
| WO | 2014151718 A2 | | 9/2014 | |
| WO | WO-2019105576 A1 | * | 6/2019 | ............... C08J 5/18 |
| WO | 2020264063 A1 | | 12/2020 | |

OTHER PUBLICATIONS

JP-2018057344-A, English translation (Year: 2018).*
Written Opinion of he International Searching Authority on PCT/US2020/062485 dated Mar. 24, 2021.
International Search Report on PCT/US2020/062485 dated Mar. 24, 2021.
Qunyi Tong et al., Preparation and properties of pullulan—alginate—carboxymethylcellulose blend films, Food Research International 41 (2008) 1007-1014.

* cited by examiner

Structures of cellulose and derivatives

Cellulose; R = H

Carboxymethyl cellulose; R = H or $CH_2CO_2H$

Cellulose acetate; R = H or $COCH_3$

Hydroxypropylmethyl cellulose; R = H or $CH_3$ or $CH_2CH(OH)CH_3$

Hydroxyethyl cellulose; R = H or $CH_2CH_2OH$

Ethyl cellulose; R = H or $CH_3$ or $CH_2CH_3$

FIG. 1

End of life for cellulose and derivatives

NATURAL PACKAGING COMPOSITION

REFERENCE TO RELATED APPLICATIONS

This application claims the benefit of U.S. Provisional Application No. 62/941,015, filed Nov. 27, 2019, which is incorporated herein by reference in its entirety.

BACKGROUND

There is currently a massive explosion of packaging materials because they provide convenient delivery, single-use dosing, and safe, sterile handling. The growth in packaging has been exasperated by the rapid expansion of at-home delivery, which often comes with excessive packaging to prevent breakage, spoilage or loss. There is a current difficulty in optimizing a package's end-of-life fate, due to challenges of sorting and recycling plastics and the increasing diversity of mixed packaging streams, especially encountered in E-commerce applications. Most conventional packaging is made from petroleum-based thermoplastics due to their convenience and low cost; however, heavy use of these plastics stresses the environment because they lack degradability and are derived from non-renewable sources. One widely-used environmentally-persistent polymer is polyvinyl alcohol (PVA), with a market size of over $700 million in 2016 which is projected to be >$1.2 billion by 2025.

PVA is a synthetic water-soluble resin and is generally prepared by the hydrolysis of polyvinyl acetate. The various properties of PVA are dependent on its degree of hydrolysis and, to some extent, its degree of polymerization. For example, fully hydrolyzed PVA (with <2% acetyl groups by weight) is a highly crystalline polymer, which dissolves only in water greater than about 60° C., while a PVA with higher weight percent acetyl groups is less crystalline and can be readily dissolved in water at ambient temperatures. The melting point and mechanical properties can also be tuned in a similar manner.

Because of its properties, PVA is one of the most widely investigated water soluble film-forming polymers. One exemplary application is for laundry detergent pods and other non-touch unit dose concentrates. However, despite the suitability of the rapid solubility of PVA formulations in such applications, PVA and PVA blends have not been shown to be degradable using common environmental organisms nor would they generally pass the labeling standards such as ASTM D6400 for plastics designed to be aerobically composted in industrial composting or wastewater facilities. These formulations not only target pod delivery systems but also other challenging plastic situations, including film laminates, micro scrubs, encapsulates, water-soluble films and capsules that invoke "invisible" packaging. These films appear to disappear "down the drain" or "before your eyes." However, since they are not degradable, these "invisible" plastics persist in the environment and have the potential to threaten our food chain through ingestion by small organisms.

The need exists for a highly biodegradable substitute for PVA with tunable properties that enable it to be used in specific commercial applications that require water-soluble films, including as a safe coating for laundry pods. Moreover, it needs to be degradable in wastewater and soil environments, yet still offer the functional advantages of petroleum-derived synthetic or semisynthetic commercial materials that remain persistent in the environment at end-of-life.

All of the references cited herein, including U.S. Patents and U.S. Patent Application Publications, are incorporated by reference in their entirety.

Mention of trade names or commercial products in this publication is solely for the purpose of providing specific information and does not imply recommendation or endorsement by the U.S. Department of Agriculture.

SUMMARY

According to the present invention, a packaging material composition may be biodegradable and may be water-soluble or water dispersible. The packaging material may include a biodegradable nonionic polysaccharide, a biodegradable ionic polysaccharide, and a plasticizer. Optionally, additional components may be added to the packaging material for a desired purpose. Additional components may include a biocide, clay, metal oxides (i.e. titanium dioxide and zinc oxide), modified nanoclays, fibers, dyes, pigments, fragrances, one or more crosslinkers, other functional agents, and residual solvent from the packaging material production process.

According to further embodiments, the nonionic polysaccharide may be pullulan, a pullulan derivative, inulin, guar, cellulose, konjac, agar, agarose, curdlan, hydroxypropylmethyl cellulose, hydroxyethyl cellulose, methyl cellulose, hydroxypropyl cellulose, hydroxypropyl guar, cellulose acetate, cellulose aldehyde, carboxymethyl starch, hydroxypropyl starch, hydroxyethyl starch, starch acetate, and starch aldehyde; the ionic polysaccharide may be one of carboxymethyl cellulose, alginate, xanthan gum, gum arabic, gum tragacanth, locust bean gum, tara gum, carboxymethyl starch, cationic starch, chitosan, gelatin, gellan, pectin, and carrageenan; and the plasticizer may be one of sorbitol, glycerin, polyethylene glycol, 1,2-propanediol, 1,3-propanediol, 1,2-butane diol, 1,3-butane diol, 1,2-pentane diol, 1,3-pentane diol, a diol of C6-C10, maltodextrin, xylitol, maltitol, mannitol, erythritol, trehalose, isomalt, pectin, and dextran. According to some embodiments, combinations of multiple biodegradable nonionic polysaccharides, biodegradable ionic polysaccharides, and/or plasticizers may be desired, depending on the desired characteristics of the resulting composition.

According to another embodiment of the invention, a packaging material may include a first polysaccharide, a second polysaccharide, and a plasticizer, where the first polysaccharide is one of pullulan and a pullulan derivative. The second polysaccharide may be one of inulin, guar, cellulose, hydroxypropylmethyl cellulose, hydroxyethyl cellulose, hydroxypropyl guar, cellulose acetate, cellulose aldehyde, carboxymethyl starch, hydroxypropyl starch, hydroxyethyl starch, starch acetate, starch aldehyde, carboxymethyl cellulose, alginate, xanthan gum, carboxymethyl starch, cationic starch, and chitosan.

According to a further embodiment, the packaging composition may be in a solid state. Additionally, the packaging composition may be biodegradable in at least one environment.

According to another embodiment, the packaging composition may be affixed to a substrate. Such a substrate may be water-soluble, water dispersible, and/or biodegradable. An example of such a substrate is water-soluble paper.

According to a further embodiment of the invention, the nonionic polysaccharide may be present in about 20-70 wt % on a dry basis, the ionic polysaccharide may be present in about 1-15 wt % on a dry basis, and the plasticizer may be present in about 15-30 wt % on a dry basis. In specific embodiments, narrower ranges of the amounts of each component may be desired for a particular use or characteristic in the final product.

According to a further embodiment of the invention, all of the components of the packaging material may be of food grade quality. Thus, the packaging material itself may be of food grade.

According to another embodiment of the invention, a method for the creation of a packaging composition may include combining two different polysaccharides and a plasticizer in an aqueous solution, and forming a film from the aqueous solution. The forming of the film from the aqueous solution may be done using any known method, for example solution casting, lamination, or extrusion.

BRIEF DESCRIPTION OF THE FIGURES

Advantages of embodiments of the present invention will be apparent from the following detailed description of the exemplary embodiments.

The following detailed description should be considered in conjunction with the accompanying figures in which.

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Unless defined otherwise, all technical and scientific terms used herein have the same meaning as commonly understood by one of ordinary skill in the art to which the invention belongs. As used herein, the term "about" refers to a quantity, level, value, or amount that varies by as much as 20%, preferably by as much as 10%, and more preferably by as much as 5% to a reference quantity, level, value, or amount. Although any methods and materials similar or equivalent to those described herein can be used in the practice or testing of the present invention, the preferred methods and materials are now described.

The term "biodegradable" or "biodegradable material" as used herein refers to a compound or composition which can be converted to a degraded biomass, $CO_2$, and water through a thermochemical degradation process within at most 18 months. A biodegradable material according to the present invention meets ASTM (e.g. D6400) or ISO standards for biodegradation in specific environments, such as (but not limited to) industrial compost or marine environments. The thermochemical process may involve the presence of above ambient temperatures, microorganisms, and/or aerobic conditions.

As a result of the thermochemical degradation, biodegradable materials generally exhibit loss in properties over time that can be quantified by standard tests. These types of biodegradable materials can include (but are not limited to) polyhydroxyalkanoates, which include (but are not limited to) polyhydroxybutyrates and polylactic acids, biomass, and polysaccharides.

The term "biomass" as used herein refers to organic plant-based residues. In particular, it refers to plant-based material which contains a high percentage of lignocellulosic material and may refer to a whole plant or parts thereof, such as fibers from a plant or a plant part.

Figure 1:
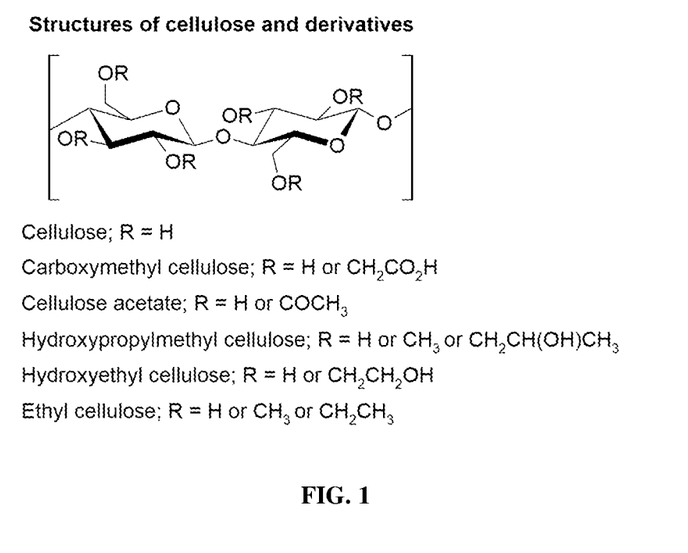
FIG. 1 shows structures of celluloses and derivatives.
Figure 2:
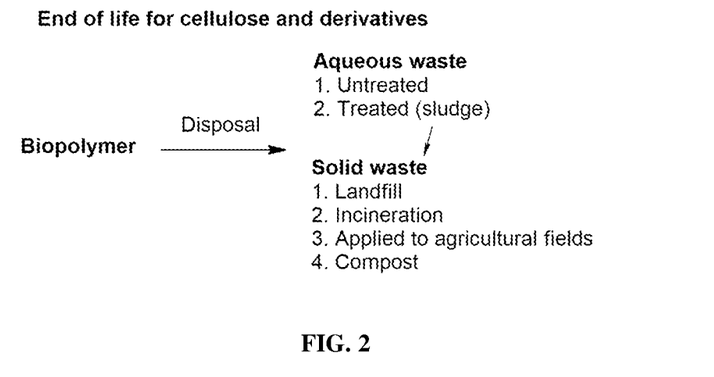
FIG. 2 shows an end of life schematic for waste celluloses.
Figure 3:
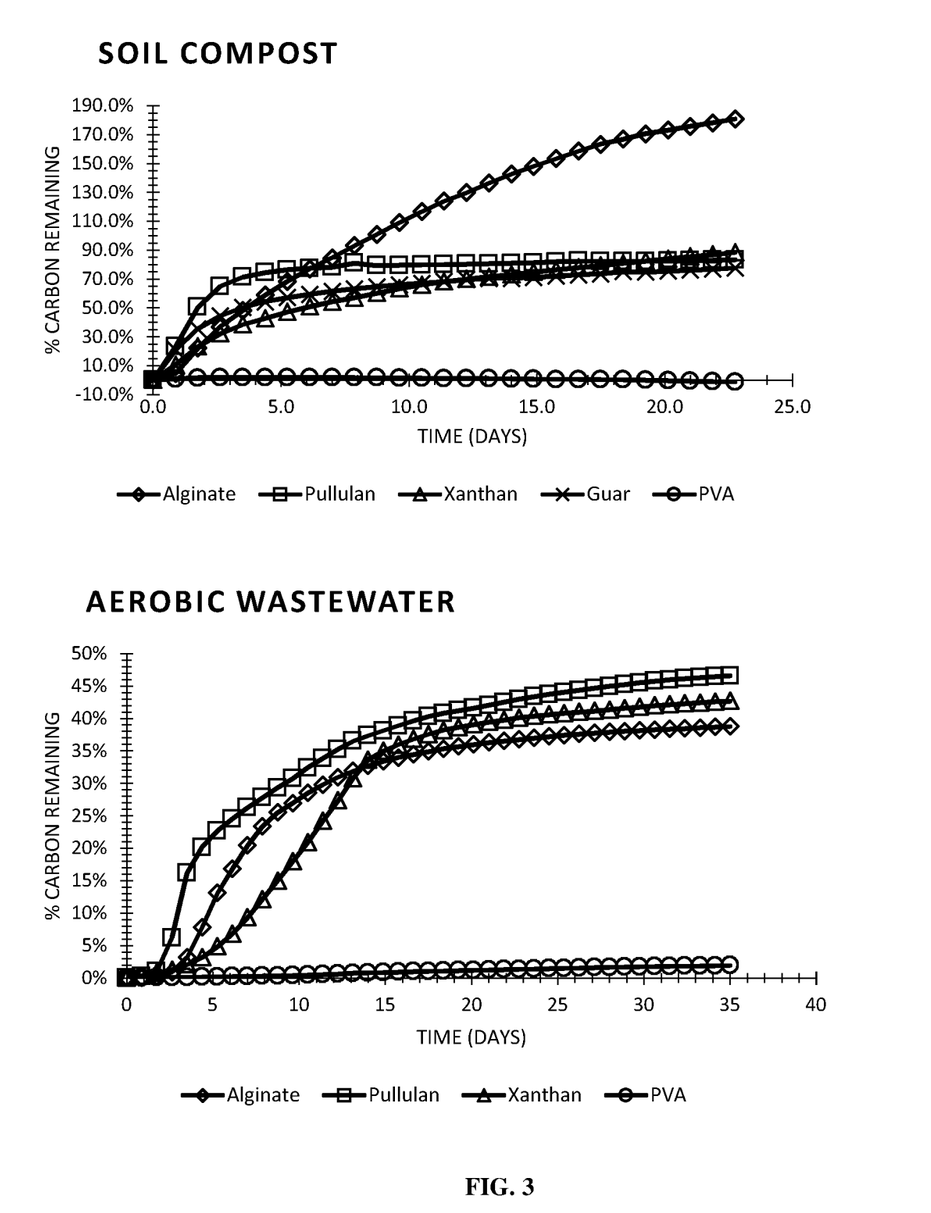
FIG. 3 shows biodegradation of PVA compared to natural polymers in both soil compost and aerobic wastewater.
Figure 4:
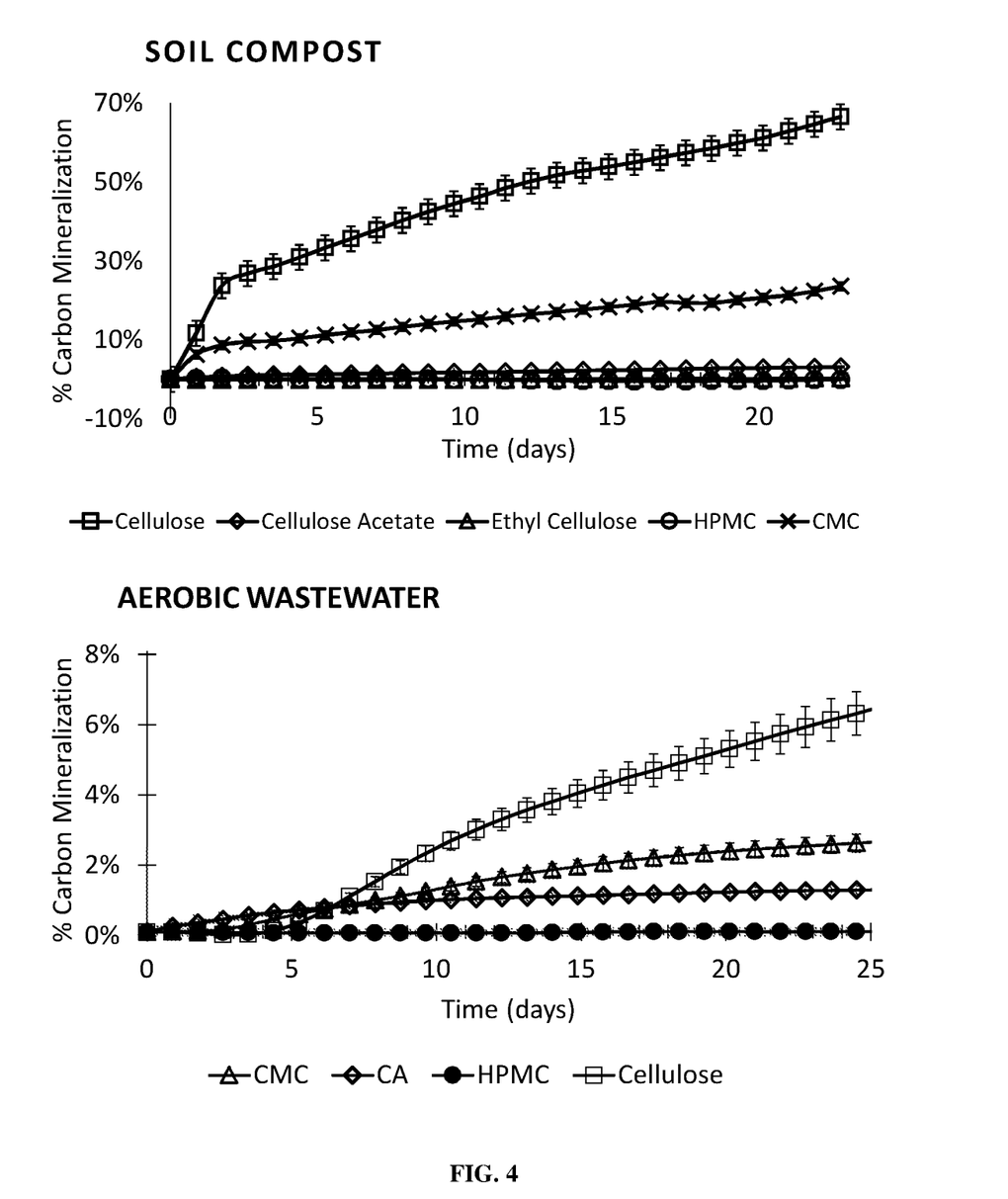
FIG. 4 shows biodegradation of cellulose compared to semisynthetic derivatives in both soil compost and aerobic wastewater.

Biodegradation may be monitored by measuring accumulated $CO_2$ relative to a baseline that does not contain test material. The accumulation of $CO_2$ is a direct measurement of the thermodynamic final product of material consumption and is among the most rigorous metrics for assessing full biodegradation. Monitoring oxygen and starting material consumption alone does not account for the possibility that starting material could be consumed, yet not entirely mineralized to $CO_2$. Plots of the percent mineralization versus time fit well to pseudo first-order kinetic models (eq. 1 below, FIGS. 3, 4).

$$[A] = [A]_0 e^{-k_{obs} t} \qquad (1)$$

Determination of first-order rate constants ($k_{obs}$) enabled the calculation of reaction half-lives and projected material lifetimes of various materials (Table 1 below). As can be seen in Table 1, PVA is not biodegradable, but all of alginate, pullulan, and carboxymethyl cellulose (CMC) are biodegradable.

TABLE 1

Kinetic parameters of biopolymer mineralization

| Substance | Medium | $k_{obs}$ (days$^{-1}$) | Half-life (days) | Extrapolated lifetime (5 half-lives, 97% conv.) |
|---|---|---|---|---|
| PVA | Soil | ≤0.001 | ≥3400 | ≥9 years |
| | Wastewater | 0.0006 | 1200 | 16 years |
| Alginate | Soil | 0.18 | 3.9 | 19 days |
| | Wastewater | 0.038 | 18 | 3.0 months |
| Pullulan | Soil | 0.2 | 3.5 | 17 days |
| | Wastewater | 0.049 | 14 | 2.4 months |
| Carboxymethyl cellulose | Soil | 0.0082 | 85 | 1.2 years |
| | Wastewater | 0.0012 | 580 | 7.9 years |

The terms "ionic polysaccharide" and "nonionic polysaccharide" refer to polysaccharides with different numbers of charged units. An ionic polysaccharide according to the present invention has at least 0.1 charged units per monomer, whereas a nonionic polysaccharide has less than 0.1 charged units per monomer. Examples of ionic polysaccharides include, but are not limited to, carboxymethyl cellulose, alginate, xanthan gum, carboxymethyl starch, cationic starch, and chitosan. Examples of nonionic polysaccharides include, but are not limited to, pullulan, pullulan derivatives, inulin, guar, cellulose, hydroxypropylmethyl cellulose, hydroxyethyl cellulose, hydroxypropyl guar, cellulose acetate, cellulose aldehyde, carboxymethyl starch, hydroxypropyl starch, hydroxyethyl starch, starch acetate, and starch aldehyde.

The term "plasticizer" as used herein refers to a material that increases the flexibility and/or softens the final composition product. The plasticizer is explicitly a separate and different component from either of the at least two polysaccharides which are also present in the packaging composition.

The term "functional agent" as used herein refers to a material that adds to or enhances the properties of the final composition product. Examples of functional agents include, but are not limited to, biocides, clays, metal oxides, dyes, pigments, fragrances, structural enhancers, and crosslinkers.

The term "structural enhancer" refers to a solid material added to a film-forming solution or dispersion resulting in a heterologous film. Structural enhancers include, but are not limited to, crystals, nanocrystals, fibers, fibrils, and nanofibers, and can be made of any known material for such structures. The present invention, directed toward a biodegradable packaging composition, only makes use of biodegradable structural enhancers.

Other compounds may be added to the composition provided they do not substantially interfere with the intended activity and efficacy of the composition; whether or not a compound interferes with activity and/or efficacy can be determined, for example, by the procedures utilized below.

The amounts, percentages, and ranges disclosed herein are not meant to be limiting, and increments between the recited amounts, percentages, and ranges are specifically envisioned as part of the invention.

"Optional" or "optionally" means that the subsequently described event or circumstance may or may not occur, and that the description includes instances in which said event or circumstance occurs and instances where it does not. For example, the phrase "optionally comprising X" means that the composition may or may not contain X, and that this description includes compositions that contain and do not contain X.

The term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein.

According to at least one exemplary embodiment, the present invention is directed to a packaging material composition which is biodegradable and either water-soluble or water dispersible. The packaging material may include a biodegradable nonionic polysaccharide, a biodegradable ionic polysaccharide, and a plasticizer. In other embodiments, the packaging material may include pullulan or a pullulan derivative, a plasticizer, and a second polysaccharide.

The nonionic polysaccharide may be pullulan, a pullulan derivative, inulin, guar, cellulose, konjac, agar, agarose, curdlan, hydroxypropylmethyl cellulose, hydroxyethyl cellulose, methyl cellulose, hydroxypropyl cellulose, hydroxypropyl guar, cellulose acetate, cellulose aldehyde, carboxymethyl starch, hydroxypropyl starch, hydroxyethyl starch, starch acetate, starch aldehyde, and a combination of the above.

The ionic polysaccharide may be one of carboxymethyl cellulose, alginate, xanthan gum, gum arabic, gum tragacanth, locust bean gum, tara gum, carboxymethyl starch, cationic starch, chitosan, gelatin, gellan, pectin, carrageenan, and a combination of the above.

The plasticizer may be one of sorbitol, glycerin, polyethylene glycol, 1,2-propanediol, 1,3-propanediol, 1,2-butane diol, 1,3-butane diol, 1,2-pentane diol, 1,3-pentane diol, a diol of C6-C10, other polyhydric alcohols, maltodextrin, xylitol, maltitol, mannitol, erythritol, trehalose, isomalt, other alcohol derivatives, pectin, and dextran.

Optionally, additional components may be added to the packaging material for a desired purpose. Additional components may include biocide, clay, metal oxides (i.e. titanium dioxide and zinc oxide), modified nanoclays, fibers, dyes, pigments, fragrances, one or more crosslinkers, other functional agents, and residual solvent from the packaging material production process. The biocide may function as a preservative, for example as an antifungal agent to prevent mold growth.

In the present invention, a "clay" included in the film composition refers to a natural or synthetic clay, and may include any suitable colloidal layered silicate. A "nanoclay" refers to a clay with nanoscale particulates therein.

According to another exemplary embodiment, the present invention is directed to a method of making a packaging material composition which is biodegradable and water-soluble. The method may include combining at least two different biodegradable polysaccharides and a plasticizer and forming a film from the combination. The packaging material may be made using any known or conventional techniques, including a solution casting method, lamination, or extrusion.

For example, cast films can be prepared by the evaporation of water at a range of temperatures and times, with lower temperatures implying longer times. For example, a room temperature (25° C.) may require days to form a film, while temperatures of over 100° C. may enable the formation of films on the order of minutes or seconds.

Example 1: Films and their Mechanical Properties

Production of Films

Glycerin was obtained from ADM. Acticide® MBS was obtained from Thor. Sorbitol 70% and Sorbitol 100% powders were obtained from Ingredion. Maltodextrin was obtained from Ingredion. Aqualon® CMC7LT is a carboxymethylcellulose, degree of substitution=0.7, and was obtained from Ashland. Alginate Protanal 6650 was obtained from DuPont. Pullulan was purchased from Nutri-Science Innovations. All materials were used without further purification.

Several different compositions of packaging material films were created and films were cast using a solution casting method. The compositions of each film are given in Tables 2a and 2b below. Table 2a gives the composition of the casting solution and Table 2b gives the composition of the final films on a dry weight basis.

TABLE 2a

Compositions of film-forming solutions (wt %)

| | 136-1 | 136-2 | 136-3 | 171-2 | 124-1 | 123-1 | 126-2 | 12-1 | 58-1 | 139-1 | 139-2 | 139-3 | 139-4 | 5-1 | 8-1 |
|---|---|---|---|---|---|---|---|---|---|---|---|---|---|---|---|
| Deionized (DI) Water | 72 | 72.0 | 72 | 66.84 | 80.8 | 72 | 73 | 68.2 | 68.1 | 70 | 70 | 72.3 | 75.1 | 75.7 | 75.4 |
| Glycerin | 5 | 5 | 5 | 7.43 | 4 | 5 | 5 | 6.2 | 6.2 | 5 | 5 | 5 | 5 | 5 | 5 |
| Acticide® MBS[1] | 0.2 | 0.2 | 0.2 | 0.2 | 0.2 | — | 0.2 | 0.2 | 0.2 | — | — | — | — | 0.2 | — |
| Sorbitol 100%[2] | 10 | 10.0 | 10 | — | — | 10 | 10 | — | — | — | — | — | — | — | — |
| Sorbitol 70%[2] | — | — | — | 8.83 | — | — | — | 7.3 | 7.3 | 7.3 | — | — | 7.2 | 5.4 | 5.4 |
| Sodium benzoate | — | — | — | — | — | — | — | — | — | 0.5 | 0.5 | 0.5 | 0.5 | 0.5 | 0.5 |
| Potassium sorbate | — | — | — | — | — | — | — | — | — | 0.2 | 0.2 | 0.2 | 0.2 | — | — |
| Maltodextrin | — | — | — | 6.18 | — | — | — | 5.1 | 5.1 | 5 | 5 | — | — | — | — |
| Aqualon® CMC[3] 7LT | 3 | — | 1.5 | 2.48 | — | 3 | — | 2.1 | 2.1 | — | — | — | — | — | — |
| Alginate protanal 6650 | — | 3 | 1.5 | 0.61 | 5 | — | 1.5 | 0.5 | 0.5 | 2 | 2 | 2 | 2 | 2 | 2.5 |
| Pullulan | 10 | 10.0 | 10 | 7.43 | 10 | 10 | 10 | 10.3 | 10.3 | 10 | 17.3 | 15 | 10 | 11.25 | 11.25 |
| Citric acid 25%[4] | — | — | — | — | — | — | — | 0.3 | — | — | — | — | — | — | — |
| TOTAL | 100.2 | 100.2 | 100.2 | 100 | 100 | 100 | 99.7 | 100.2 | 99.8 | 100 | 100 | 95 | 100 | 100 | 100 |

[1] a commercial isothiazolinone-based biocide
[2] sorbitol 100% is sorbitol in powder form, and sorbitol 70% is an aqueous solution with 70 wt % sorbitol
[3] carboxymethyl cellulose
[4] an aqueous solution that is 25 wt % citric acid TABLE 2b Compositions of films on dry-weight basis (wt %)

| | 136-1 | 136-2 | 136-3 | 171-2 | 124-1 | 123-1 | 126-2 | 12-1 | 58-1 | 139-1 | 139-2 | 139-3 | 139-4 | 5-1 | 8-1 |
|---|---|---|---|---|---|---|---|---|---|---|---|---|---|---|---|
| Glycerin | 17.7 | 17.7 | 17.7 | 22.4 | 20.8 | 17.9 | 18.7 | 21 | 21.1 | 18.1 | 16.8 | 22 | 22 | 21.8 | 22 |
| Acticide® MBS[1] | 0.7 | 0.7 | 0.7 | 0.6 | 1 | — | 0.7 | 0.7 | 0.7 | — | — | — | — | 0.9 | — |
| Sorbitol | 35.5 | 35.5 | 35.5 | 26.6 | — | 35.7 | 37.5 | 17 | 17.1 | 18.1 | — | — | 22 | 16.9 | 16 |
| Sodium benzoate | — | — | — | — | — | — | — | — | — | 1.8 | 1.7 | 2.2 | 2.2 | 2.2 | 2.2 |
| Potassium sorbate | — | — | — | — | — | — | — | — | — | 0.7 | 0.7 | 0.9 | 0.9 | — | — |
| Maltodextrin | — | — | — | 18.6 | — | — | — | 17 | 17.1 | 18.1 | 16.8 | — | — | — | — |
| Aqualon® CMC[2] 7LT | 10.6 | — | 5.3 | 7.5 | — | 10.7 | — | 7.1 | 7.1 | — | — | — | — | — | — |
| Alginate protanal 6650 | — | 10.6 | 5.3 | 1.8 | 26 | — | 5.6 | 1.8 | 1.8 | 7.2 | 6.6 | 8.8 | 8.8 | 8.7 | 11 |
| Pullulan | 35.5 | 35.5 | 35.5 | 22.4 | 52.1 | 35.7 | 37.5 | 35 | 35.1 | 36 | 57.4 | 66.1 | 44.1 | 49.5 | 48.8 |
| Citric acid | — | — | — | — | — | — | — | 0.3 | — | — | — | — | — | — | — |
| TOTAL | 100 | 100 | 100 | 100 | 100 | 100 | 100 | 100 | 100 | 100 | 100 | 100 | 100 | 100 | 100 |

[1] a commercial isothiazolinone-based biocide
[2] carboxymethyl cellulose

For the preparation of each film, liquid and aqueous ingredients were added to DI water and heated to about 50-60° C. and placed in a homogenizer (Silverson L5M-A) or otherwise mixed. The rest of the components were dry-mixed together separate from the aqueous solution, and then the dry mixture was added to the aqueous solution. The resulting suspension was then heated to slightly above 50° C. Once at 50° C., the solution was stirred while maintaining temperature for an hour. The resulting solution was then cast in a silicone mold and dried at 40° C. overnight.

Characterization of Films

The films were tested for tensile properties and compared to a commercial PVA (Solublon®). See Table 3 below.

TABLE 3

Physical characteristics of film compositions and commercial PVA

| SAMPLE | MODULUS (MPa) | TENSILE STRENGTH (MPa) | % ELON-GATION |
|---|---|---|---|
| PVA | 43.48 ± 4.88 | 45.59 ± 4.75 | 346.27 ± 21.67 |
| 136-1 | 0.33 ± 0.09 | 0.69 ± 0.54 | 622.30 ± 44.78 |
| 136-2 | 5.50 ± 1.36 | 5.67 ± 2.42 | 175.53 ± 46.41 |
| 136-3 | 2.85 ± 0.35 | 4.87 ± 0.66 | 334.89 ± 54.84 |
| 171-2 | 4.68 ± 1.9 | 6.09 ± 0.42 | 213.75 ± 19.73 |
| 123-1 | 5.94 ± 1.06 | 10.27 ± 1.56 | 218.13 ± 38.55 |
| 126-2 | 6.87 ± 0.61 | 12.83 ± 1.71 | 262.7 ± 36.28 |
| 12-1 | 35.09 ± 17.91 | 3.96 ± 1.23 | 73.51 ± 41.61 |
| 139-1 | 21.24 ± 11.94 | 16.83 ± 6.10 | 158.19 ± 53.71 |
| 139-3 | — | 20.21 ± 18.56 | 72.44 ± 65.15 |
| 139-4 | 93.05 ± 7.13 | 20.05 ± 3.40 | 71.72 ± 17.73 |
| 5-1 | 15.88 ± 3.96 | 12.83 ± 5.76 | 113.13 ± 27.37 |
| 8-1 | 26.07 ± 5.44 | 20.90 ± 4.37 | 110.18 ± 9.86 |

As can be seen in Table 3, the properties of the film and film composition can be adjusted based on the specific composition of ingredients used (refer to Tables 2a and 2b). The properties can be further adjusted with additional additives as described below.

Example 2: Mechanical Properties Affected by Additives

The effects of adding clays, metal oxides, cellulose fibers, cellulose aldehyde fibers, crosslinkers, and plasticizers to the films were tested. In all cases, a PVA film were used as the controls and the effects of the additives were studied by modifying a base film composition to include the stated additives at the stated amount to create test films. The additives were added prior to the homogenization step to ensure an even distribution in the films, thus the wt % given in all tables below refer to the wt % in solution. Weight percent on a dry basis can be calculated using that information.

Clays. The effect of two clay powders, Laponite® (a colloidal layered silicate) and hectorite was studied. The results are shown in Table 4 below:

TABLE 4

Tensile data of film compositions with clay added

| SAMPLE | MODULUS (MPa) | TENSILE STRENGTH (MPa) | % ELON-GATION |
|---|---|---|---|
| PVA | 43.48 ± 4.88 | 45.59 ± 4.75 | 346.27 ± 21.67 |
| Base film: 171-2 | 5.76 ± 1.71 | 7.06 ± 2.16 | 202.41 ± 41.46 |
| Laponite ® 2.5 wt % | 2.77 ± 0.59 | 4.75 ± 1.66 | 300.39 ± 74.93 |
| Laponite ® 6 wt % | 3.08 ± 0.51 | 3.46 ± 0.46 | 460.72 ± 150.29 |
| Hectorite 6 wt % | 14.57 ± 3.86 | 5.82 ± 0.63 | 220.85 ± 95.48 |

As can be seen in Table 4, the addition of Laponite® generally increases the elongation when added to the base formula (171-2), with a corresponding decrease in the modulus and tensile strength. The addition of hectorite increases the modulus and preserved the elongation, with no significant changes to the tensile strength. Without being limited to theory, Laponite® might have such an effect on the elongation because of its ability to disperse within the polymer matrix and create gel like structures when it is mixed with water.

Metal oxides. The effect of metal oxides on the mechanical properties of the films was determined by adding titanium dioxide and zinc oxide. The results are shown in Table 5 below:

TABLE 5

Tensile data of film compositions with metal oxides added

| SAMPLE | MODULUS (MPa) | TENSILE STRENGTH (MPa) | % ELON-GATION |
|---|---|---|---|
| PVA | 43.48 ± 4.88 | 45.59 ± 4.75 | 346.27 ± 21.67 |
| Base film: 171-2 | 5.76 ± 1.71 | 7.06 ± 2.16 | 202.41 ± 41.46 |
| TiO$_2$ 0.5 wt % | 6.41 ± 2.01 | 7.43 ± 2.19 | 164.87 ± 37.97 |
| TiO$_2$ 1.0 wt % | 4.95 ± 4.01 | 5.76 ± 0.93 | 193.07 ± 39.12 |
| ZnO 0.5 wt % | 3.76 ± 0.5 | 7.01 ± 0.61 | 239.12 ± 26.13 |
| ZnO 1.0 wt % | 8.41 ± 2.69 | 8.7 ± 1.96 | 176.26 ± 25.64 |

As can be seen in Table 5, when adding ZnO or TiO$_2$, there are no significant changes to the tensile properties from the base formula. There is a slight increase in the modulus at 1 wt % ZnO.

Cellulose fibers. Hemp and *Eucalyptus* nanofibers (cellulose nanofibers, CNF) were prepared and used, and were compared against commercially available materials including one commercial source of cellulose nanocrystals (acquired from the University of Maine) and two commercial sources of cellulose nanofibers (Cellulon L93, CP Kelco; and Exilva, Borregaard). The Exilva fibers are microfibrillated cellulose fibers (MFC), and may be referred to as such.

To prepare the hemp and *Eucalyptus* fibers to be dispersed, the fibers/fibrils had to separated. In order to ease the mechanical separation, the fibers were first oxidized to produce instances of electrostatic repulsion between anionically-charged cellulose microfibrils. Oxidation of the fibers may also remove any remaining lignin in the pulp.

To oxidize the fibers, uncut, raw hemp and *Eucalyptus* pulp fibers were added to water and the mixture stirred to start the dispersion. Two solutions of 0.08 g TEMPO (2,2,6,6-tetramethylpiperidine-1-oxyl radical catalyst) dissolved in 25 mL of water and 0.5 g NaBr dissolved in 10 mL of water were added to the fibers and mixed thoroughly. A solution of 6% bleach was added dropwise to the dispersion while maintaining a pH between 9.5 and 11. The amount of the bleach solution to be added was determined to be when there was 10 mmol NaClO/g fiber pulp After all of the bleach was added, an NaOH solution was added dropwise to the reaction to maintain a pH of 10 during the reaction process. The reaction was continued for 3 hours after all the bleach was added. After 3 hours 50 mL of 100% ethanol was added to stop the oxidation. The pH of the reaction was brought down to 7 by adding HCl solution dropwise to the mixture. The mixture was then washed with deionized water over a 250 μm sieve and the solids were resuspended in deionized water in a glass bottle.

Mechanical fibrillation was then used to separate the oxidized fibers. The fibrillation was carried out using a Silverson Homogenizer. First, the suspended fiber sample was diluted to 0.5% solid concentration, and the container placed on ice to prevent the suspension from over heating during the high shear mixing process. The suspension was mixed at 8000 rpm for 40 minutes, and once completed, the fibers were stored in suspension for later use as additives in the films. To add the fibers to the film-forming mixture, calculated amounts of fiber suspensions of 2.6 g/L were added to achieve the desired final concentration in the films.

The results of adding the various cellulose sources to the films are shown in Table 6 below:

TABLE 6

Tensile data of film compositions with cellulose fibers added

| SAMPLE | MODULUS (MPa) | TENSILE STRENGTH (MPa) | % ELONGATION |
|---|---|---|---|
| PVA | 43.48 ± 4.88 | 45.59 ± 4.75 | 346.27 ± 21.67 |
| Base film: 171-2 | 5.76 ± 1.71 | 7.06 ± 2.16 | 202.41 ± 41.46 |
| Hemp CNF 2.5 wt % | 8.92 ± 0.65 | 2.34 ± 0.23 | 252.75 ± 43.14 |
| Hemp CNF 6 wt % | 64.69 ± 9.8 | 9.32 ± 1.01 | 76.11 ± 14.59 |
| Eucal. CNF 1 wt % | 4.57 ± 0.27 | 8.85 ± 1.05 | 242.05 ± 20.08 |
| Eucal. CNF 2.5 wt % | 21.18 ± 2.72 | 10.88 ± 0.48 | 194.83 ± 25.69 |
| Eucal. CNF 6 wt % | 122.26 ± 8.79 | 20.55 ± 5.11 | 97.69 ± 4.68 |
| Cell. crystals 6 wt % | 8.96 ± 3.1 | 5.83 ± 2.7 | 210.62 ± 35.96 |
| Fibers (a)[1] 6 wt % | 16.87 ± 7.31 | 7.43 ± 2.26 | 230.66 ± 46.13 |
| Fibers (b)[1] 6 wt % | 45.22 ± 14.38 | 17.54 ± 1.7 | 88.54 ± 3.30 |

[1]Cellulose fibers bought commercially, (a) Cellulon L93 and (b) Exilva

As can be seen in Table 6, the hemp and *Eucalyptus* fibers show higher modulus and tensile strength compared to the base formula and to the commercially available cellulose. However, the percent elongation is also significantly decreased with increasing concentrations of nanofibers. This trade-off is not observed for Cellulon L93 but is apparent for Exilva. Notably, the addition of *Eucalyptus* CNF at 6 wt % changes the modulus by an order of magnitude and more than doubles the tensile strength.

Cellulose aldehyde fibers. Cellulose fibers can be chemically modified by cleaving the C2-C3 bond in the cellulose ring resulting in two aldehyde units through $NaIO_4$ (sodium periodate) oxidation. These aldehyde groups can become the basis of various functionalizations of cellulose.

To create cellulose aldehyde fibers, hemp fibers which had been chemically and mechanically separated as described above were suspended at about 0.33% weight basis in water. 385 mL of the suspension was heated to about 70° C., then the pH was brought down to 4 using a sulfuric acid solution, and finally 1.98 g of $NaIO_4$ (sodium periodate) was added to the mixture. The reaction beaker was completely covered with aluminum foil to prevent the degradation of the $NaIO_4$ and was mixed with a magnetic stir bar at 260 rpm for 4.5 hours while maintaining a heat of about 70° C. After 4.5 hours the reaction mixture was washed over a 125 μm sieve with deionized water, and then resuspended in deionized water. UV-VIS spectroscopy was used to monitor the concentration of $NaIO_4$ remaining in the reaction mixture, and the percent completion of the reaction was calculated to be about 50%.

Figure 5A:
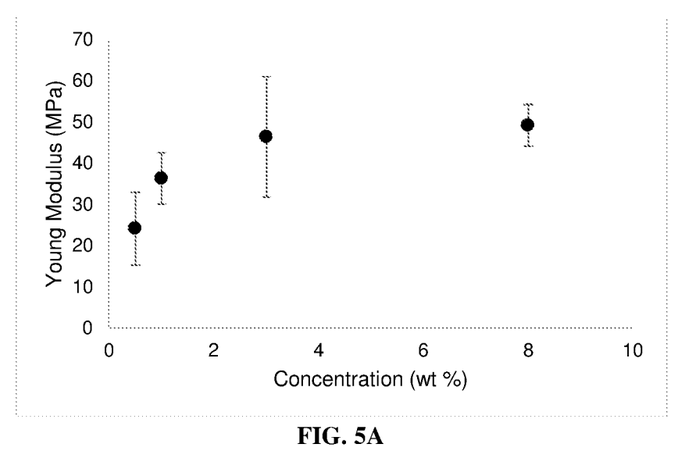
FIGS. 5A-5C show plots of the effect of different weight % of cellulose aldehyde fiber added to film structures in terms of modulus (5A), tensile strength (5B), and percent elongation (5C).
Figure 5B:
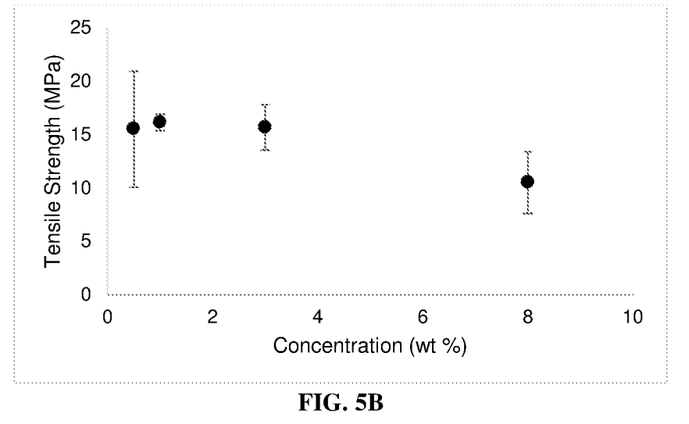
Figure 5C:
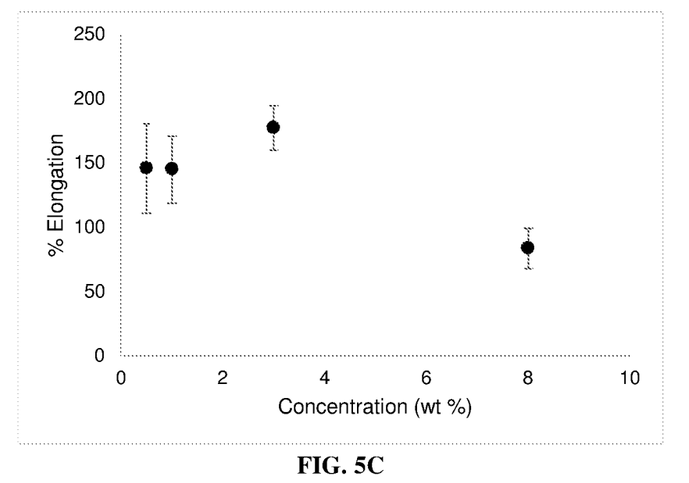

The results of adding the cellulose aldehyde fibers to the films are shown in FIGS. 5A-5C. At low concentrations (between 0.5-3 wt %), there is a relatively rapid increase in the Young's Modulus, going from 20 MPa to about 45 MPa. However, at higher concentrations, notably 8 wt %, this effect seems to plateau, and the Modulus stays relatively constant. On the other hand, the percent elongation stays constant at the lower concentrations, and sharply decreases at 8 wt %. Unlike the cellulose nanofibrils from which they are derived, cellulose aldehyde nanofibers provided enhanced modulus and strength without sacrificing elongation properties. Without being limited by theory, this advantage may be due to cross-linking between alcohol and acid functionalities in the base formula with the aldehyde groups of the cellulose aldehyde nanofibers.

Crosslinkers and plasticizers. The effects of these types of additives was investigated using polyethylene glycol (PEG) as a plasticizer and borax as a crosslinker. The results are shown in Table 7 below:

TABLE 7

Tensile data of film compositions with other additives

| SAMPLE | MODULUS (MPa) | TENSILE STRENGTH (MPa) | % ELONGATION |
|---|---|---|---|
| PVA | 43.48 ± 4.88 | 45.59 ± 4.75 | 346.27 ± 21.67 |
| Base film: 171-2 | 5.76 ± 1.71 | 7.06 ± 2.16 | 202.41 ± 41.46 |
| PEG 3350 2.5 wt % | 1.66 ± 0.19 | 4.07 ± 0.33 | 490.86 ± 74.93 |
| PEG 3350 6 wt % | 6.52 ± 2.72 | 3.08 ± 1.16 | 415.77 ± 95.48 |
| Borax 3 wt % | 22.31 ± 12.26 | 8.8 ± 2.77 | 207.87 ± 54.98 |
| Base film: 12-1 | 35.09 ± 17.91 | 3.96 ± 1.23 | 73.51 ± 41.61 |
| Borax (2.5 wt %) | 50.56 ± 14.39 | 10.65 ± 2.13 | 80.49 ± 28.26 |
| Citric acid (2.5 wt %) | 3.92 ± 2.14 | 5.06 ± 1.47 | 189.17 ± 28.29 |
| Glycerol (2.5 wt %) | 31.89 ± 12.80 | 6.92 ± 1.62 | 141.41 ± 16.08 |
| Laponite (2.5 wt %) | 31.36 ± 8.00 | 8.51 ± 1.69 | 103.89 ± 23.31 |
| PEG 8000 (2.5 wt %) | 40.05 ± 6.50 | 7.86 ± 2.08 | 79.52 ± 10.39 |
| Citric Acid (2.5 wt %) + PEG 8000 (2.5 wt %) | 2.52 ± 0.62 | 4.81 ± 1.31 | 221.34 ± 13.71 |
| MFC (6 wt %) + Laponite (6 wt %) | 50.79 ± 16.89 | 7.89 ± 2.67 | 31.70 ± 18.53 |

Notably, adding PEG to 171-2 doubled the percent elongation overall and decreased (2.5 wt %) or maintained the strength (6 wt %) and modulus, whereas additives to the 12-1 film typically resulted in either higher modulus and tensile strength or greater elongation compared to the base formulation alone. A 2.5 or 3 wt % of borax would be in excess as compared to the concentration of alginate in either base solution which would make it ideal for crosslinking. Increased tensile properties could be the result of other crosslinking occurring within the polymer matrix, such as borax and CMC.

When looking at the individual mechanical properties, elongation is important for applications such as plastic bags, films, and bottles where some flexibility is desired. High modulus and tensile strength are needed for more rigid, tear and puncture-resistant structures. Therefore, different additives and formulations will benefit specific applications depending on their unique strengths.

Example 3: Optical Properties of Films

An important component for soluble films is their transparency. The base films (i.e. 171-2) are transparent, and increased load with cellulose-based fibers did not have a significant impact, if any on the transparency of the film according to observation by eye. However, both of the clay additives tested gave the resulting film a brownish tint. The addition of the metal oxides turned the films opaque.

Example 3: Moisture Barrier and Uptake

Water vapor permeability (WVP) tests were performed with PVC pipe cells with a depth of 2.5 cm and an average radius of 1.5 cm. A relative humidity of 0% in the permeation cell was maintained using 3.3 g of anhydrous $MgSO_4$. All measurements were done in duplicates. Weight gains were recorded twice a day for five days and plotted against time. Linear regression yielded an initial slope in (g/hr), from which the water vapor transmission rate (WVTR) was calculated by dividing by the area of the film exposed as follows:

$$WVTR [=] \frac{g/hr}{m^2} \quad (2)$$

The WVP was then calculated from the WVTR as follows:

$$WVP [=] \frac{g}{hr \, m \, Pa} = \frac{WVTR}{P_{sat}^w (RH_2 - RH_1)} \times l \quad (3)$$

Where $P_{sat}^w$ is the saturation pressure of water at 63° F. (temperature average of room), $RH_2$ is the relative humidity in the desiccator (50%), $RH_1$ is the relative humidity in the permeation cell (0%), and l is the thickness of the film. The films tested were prepared as described above. The results of this experiment are shown below in Table 8:

TABLE 8

Water vapor permeability (WVP) of film compositions at 50% relative humidity

| SAMPLE | WVP (μg/h m Pa) |
|---|---|
| PVA | 0.226 ± 0.102 |
| 171-2 | 0.706 ± 0.0580 |
| Fibers (a)[1] 6 wt % | 1.02 ± 0.111 |
| Cellulose aldehyde 6 wt % | 1.00 ± 0.111 |
| Fibers (b)[1] 6 wt % | 0.722 ± 0.0869 |
| Bentonite 6 wt % | 0.699 ± 0.0650 |
| Hectorite 6 wt % | 0.672 ± 0.104 |
| Borax 3 wt % | 0.666 ± 0.0716 |
| Hemp CNF 6 wt % | 0.535 ± 0.0577 |
| Laponite ® 6 wt % | 0.479 ± 0.0683 |
| 12-1 | 0.221 ± 0.014 |
| Citric acid 2.5 wt % | 0.452 ± 0.156 |
| Citric acid 2.5 wt % and PEG 8000 2.5 wt % | 0.444 ± 0.148 |
| Glycerol 2.5 wt % | 0.389 ± 0.103 |
| Laponite ® 2.5 wt % | 0.321 ± 0.061 |
| MFC 6 wt % and Laponite ® 6 wt % | 0.289 ± 0.022 |
| PEG 8000 2.5 wt % | 0.267 ± 0.035 |
| Borax 2.5 wt % | 0.207 ± 0.015 |
| Laponite ® and CMC and Glyeryl laurate, 2.5 wt % each | 0.199 ± 0.016 |
| Cetyl alcohol 6 wt % | 0.197 ± 0.033 |

TABLE 8-continued

Water vapor permeability (WVP) of film compositions at 50% relative humidity

| SAMPLE | WVP (μg/h m Pa) |
|---|---|
| Citric acid and PEG 8000 and Glyceryl laurate, 2.5 wt each % | 0.191 ± 0.000 |
| Glyceryl laurate 6 wt % | 0.189 ± 0.004 |

[1]Cellulose fibers bought commercially, (a) Cellulon L93 and (b) Exilva

As can be seen in the above table, clays (bentonite, hectorite, and Laponite®) improved the moisture barrier (lower WVP) compared to the base formula, and the hemp fibers and borax likewise had a similar effect. However, the commercially-bought cellulose fibers and the cellulose aldehyde fibers increased the WVP, weakening the moisture barrier.

Moisture uptake of the films was also tested by cutting out 4.5 cm diameter circles of films that were placed in a desiccator at 50% RH. The weight was recorded immediately after being placed in an oven at 40° C. overnight, and after five days, when the weight was constant. Moisture uptake was calculated as follows using the final and initial weights ($W_f$ and $W_i$):

$$\text{Moisture Uptake} = \frac{W_f - W_i}{W_i} \times 100\% \quad (4)$$

The results are shown in Table 9 below:

TABLE 9

Moisture uptake of different film compositions

| SAMPLE | MOISTURE UPTAKE (%) |
|---|---|
| PVA | 1 |
| 171-2 | 11 |
| Hectorite 6 wt % | 7 |
| Cellulose aldehyde 6 wt % | 7 |
| Fibers (a)[1] 6 wt % | 8 |
| Fibers (b)[1] 6 wt % | 8 |
| Borax 3 wt % | 10 |
| Bentonite 6 wt % | 10 |
| Laponite ® 6 wt % | 11 |
| Hemp CNF 6 wt % | 11 |

[1]Cellulose fibers bought commercially, (a) Cellulon L93 and (b) Exilva

Of particular note with the above data is that trends for relative moisture uptake do not necessarily correlate with water vapor permeability. For example, though hectorite had a significant impact, the addition of Laponite® did not significantly affect uptake at all.

Example 4: Film Solubility and Degradation

Trials were done to determine the solubility of a film according to the present invention as compared to commercial PVA. The tests were done by placing 30 g of sample (ranging from 0.2-0.4 mm in thickness) in DI water at room temperature. Film composition 12-1 was used as the base film for this test, with various additives to that composition studied to determine their effect, if any, on solubility. The tests were done in triplicate and the results averaged, as shown in Table 10 below. PVA, a commercially-purchased film, had a thickness of 0.1 mm.

TABLE 10

Solubility of film compositions and PVA

| Film | Time to dissolve (sec) |
|---|---|
| PVA | 117 |
| 12-1 Base Formula | 302 |
| PEG 8000 (2.5 wt %) | 198 |
| Glyceryl laurate (6 wt %) | 198 |
| Cetyl alcohol (6 wt %) | 222 |
| Laponite + CMC + Glyceryl laurate (2.5 wt %) | 246 |
| Glycerol (2.5 wt %) | 301 |
| Borax (2.5 wt %) | 333 |

TABLE 10-continued

Solubility of film compositions and PVA

| Film | Time to dissolve (sec) |
|---|---|
| MFC (6 wt %) + Laponite (6 wt %) | 338 |
| Laponite (2.5 wt %) | 371 |
| Citric acid + PEG 8000 + Glyceryl laurate (2.5 wt %)* | 271 |
| Citric acid (2.5 wt %) + PEG 8000 (2.5 wt %)* | 358 |
| Citric acid (2.5 wt %)* | 379 |

*these formulations had low solubility in neutral water; sodium carbonate was added to solubilize As can be clearly seen in Table 10, different additives can significantly affect solubility. In particular, the formulations including citric acid required treatment with sodium carbonate to solubilize the film in water.

In addition, tests of the ability of the 171-2 formulation to degrade in a marine environment were conducted (data not shown). The tests were done both with the film formulation by itself and also having the film formulation coated on water-dissolvable paper. The results indicate that the film by itself has a half-life of approximately 4 days, and the film coated on paper has a half-life of approximately 1 month. In comparison with PVA (shown in Table 1), one can clearly see that this is significantly faster.

Example 5: Effects of Humidity

The above experiments were conducted at the same humidity. To determine the effect of this possible variable of humidity, mechanical and water vapor permeability tests were performed with various formulations using 12-1 as a base formula (testing different additives to that base formulation) at 40%, 50%, and 90% humidity. The results are shown in Tables 11 and 12 below:

TABLE 11

Mechanical properties of films at different humidities

| Sample | Humidity [%] | Modulus [MPa] | Tensile Strength [MPa] | Elongation [%] |
|---|---|---|---|---|
| PVA | 40 | 34.72 ± 8.08 | 23.63 ± 5.62 | 286.94 ± 37.80 |
|  | 50 | 44.17 ± 20.01 | 20.01 ± 9.92 | 229.31 ± 52.70 |
|  | 90 | 4.81 ± 1.22 | 12.75 ± 4.12 | 406.35 ± 80.09 |
| 12-1 Base formula | 40 | 2.39 ± 0.23 | 3.93 ± 0.92 | 235.59 ± 51.07 |
|  | 50 | 1.72 ± 0.44 | 3.51 ± 0.68 | 291.48 ± 67.09 |
|  | 90 | 0.20 ± 0.03 | 0.72 ± 0.11 | 1733.80 ± 1065.03 |
| Borax (2.5 wt %) | 40 | 4.06 ± 0.59 | 4.34 ± 1.36 | 147.79 ± 29.02 |
|  | 50 | 3.48 ± 0.46 | 5.98 ± 0.39 | 224.31 ± 26.70 |
|  | 90 | 0.14 ± 0.04 | 0.55 ± 0.11 | 1225.97 ± 546.96 |
| Citric acid (2.5 wt %) | 40 | 2.66 ± 0.56 | 4.43 ± 1.29 | 203.63 ± 17.99 |
|  | 50 | 3.33 ± 1.47 | 5.09 ± 1.24 | 216.20 ± 22.41 |
|  | 90 | 0.43 ± 0.17 | 1.16 ± 0.19 | 564.77 ± 150.57 |
| Glycerol (2.5 wt %) | 40 | 2.81 ± 0.93 | 4.86 ± 1.30 | 250.04 ± 21.37 |
|  | 50 | 1.00 ± 0.17 | 2.56 ± 0.39 | 345.35 ± 52.01 |
|  | 90 | 0.23 ± 0.06 | 0.66 ± 0.09 | 1103.14 ± 546.87 |
| Laponite (2.5 wt %) | 40 | 1.93 ± 0.27 | 3.26 ± 0.57 | 218.17 ± 20.48 |
|  | 50 | 2.24 ± 0.33 | 4.04 ± 0.72 | 228.31 ± 26.06 |
|  | 90 | 0.12 ± 0.03 | 0.40 ± 0.09 | 1103.10 ± 549.50 |
| PEG 8000 (2.5 wt %) | 40 | 3.68 ± 0.82 | 5.58 ± 1.12 | 209.46 ± 18.32 |
|  | 50 | 2.23 ± 0.42 | 4.45 ± 0.26 | 272.05 ± 37.21 |
|  | 90 | 0.46 ± 0.16 | 1.04 ± 0.42 | 1411.48 ± 625.02 |
| Citric acid (2.5 wt %) + PEG 8000 (2.5 wt %) | 40 | 2.51 ± 0.27 | 4.48 ± 0.60 | 226.26 ± 33.80 |
|  | 50 | 2.19 ± 0.27 | 4.98 ± 1.00 | 275.05 ± 31.41 |
|  | 90 | 0.25 ± 0.03 | 1.04 ± 0.14 | 906.83 ± 186.88 |
| MFC (6 wt %) + Laponite (6 wt %) | 40 | 29.54 ± 4.66 | 7.63 ± 1.19 | 52.10 ± 10.31 |
|  | 50 | 35.40 ± 5.25 | 8.48 ± 1.11 | 47.01 ± 13.00 |
|  | 90 | 3.74 ± 1.44 | 1.01 ± 0.36 | 125.66 ± 26.22 |

TABLE 12

Water vapor permeabilities of films at different humidities

| Sample | Humidity [%] | WVP [μg/(hr m Pa)] | Standard Deviation |
|---|---|---|---|
| PVA | 40 | 0.017 | 0.002 |
|  | 50 | 0.121 | 0.006 |
|  | 90 | 1.030 | 0.160 |
| 12-1 Base formula | 40 | 0.025 | 0.009 |
|  | 50 | 0.221 | 0.014 |
|  | 90 | 3.440 | 0.485 |
| Borax (2.5 wt %) | 40 | 0.027 | 0.024 |
|  | 50 | 0.207 | 0.015 |
|  | 90 | 3.260 | 0.681 |
| Cetyl alcohol (6 wt %) | 40 | 0.047 | 0.023 |
|  | 50 | 0.197 | 0.033 |
|  | 90 | 2.620 | 0.186 |
| Citric acid (2.5 wt %) | 40 | 0.026 | 0.003 |
|  | 50 | 0.452 | 0.156 |
|  | 90 | 4.330 | 0.937 |
| Glycerol (2.5 wt %) | 40 | 0.023 | 0.012 |
|  | 50 | 0.389 | 0.103 |
|  | 90 | 4.140 | 0.203 |

TABLE 12-continued

Water vapor permeabilities of films at different humidities

| Sample | Humidity [%] | WVP [μg/(hr m Pa)] | Standard Deviation |
|---|---|---|---|
| Glyceryl laurate (6 wt %) | 40 | 0.041 | 0.012 |
| | 50 | 0.189 | 0.004 |
| | 90 | 3.400 | 0.710 |
| Laponite (2.5 wt %) | 40 | 0.024 | 0.014 |
| | 50 | 0.321 | 0.061 |
| | 90 | 4.800 | 0.189 |
| PEG 8000 (2.5 wt %) | 40 | 0.036 | 0.002 |
| | 50 | 0.267 | 0.035 |
| | 90 | 3.900 | 0.954 |
| Citric acid (2.5 wt %) + PEG 8000 (2.5 wt %) | 40 | 0.024 | 0.002 |
| | 50 | 0.444 | 0.148 |
| | 90 | 2.870 | 0.913 |
| MFC (6 wt %) + Laponite (6 wt %) | 40 | 0.025 | 0.002 |
| | 50 | 0.289 | 0.022 |
| | 90 | 4.190 | 0.020 |
| Citric acid + PEG 8000 + Glyceryl laurate (2.5 wt %) | 40 | 0.030 | 0.007 |
| | 50 | 0.191 | 0.000 |
| | 90 | 2.010 | 0.269 |
| Laponite + CMC + Glyceryl laurate (2.5 wt %) | 40 | 0.074 | 0.002 |
| | 50 | 0.199 | 0.016 |
| | 90 | 7.930 | 0.916 |

As can be seen in the above tables, there is no consistent across-the-board effect as between 40% and 50% humidity, but at 90% relative humidity, WVP tends to be higher and mechanical properties tend to weaken. It is noted that the films do not deteriorate quickly however, as the percent elongation at break indicates they retain their structural integrity, even if weakened.

Example 5: Stickiness and Brittleness

Films need to have a balance between flexibility and brittleness. Those that are too flexible, tend to have minimal strength but great elongation, and vice versa for brittleness. Another important property to consider for films is its stickiness. If they are too sticky, they are difficult to work with, have high elongation and no strength, and tend to stick to its surroundings, including itself. In order to address the stickiness of the base films, a few alternatives were tried.

The formulation 58-1 was used as a base and modified by adjusting the amount of maltodextrin and glycerin therein. In other tests, the maltodextrin and/or sorbitol were removed entirely. Higher levels of these ingredients generally led to higher flexibility and elasticity, but also a stickier film.

The formulation 58-1 was also used as a base to investigate carboxymethylcellulose (CMC) versus alginate. In general, increased levels of alginate resulted in reduced stickiness and elongation, with small increases in modulus and strength.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A packaging composition, consisting essentially of:
   a biodegradable nonionic polysaccharide; wherein said nonionic polysaccharide is at least one of pullulan, inulin, guar, cellulose, konjac, agar, agarose, maltodextrin, dextran and curdlan;
   a biodegradable ionic polysaccharide; wherein said ionic polysaccharide is at least one of locust bean gum, tara gum, alginate, xanthan gum, gum arabic, gum tragacanth, cationic starch, chitosan, gellan, and carrageenan;
   at least one plasticizer; wherein said plasticizer is at least one of sorbitol, glycerin, polyethylene glycol, 1,2-propanediol, 1,3-propanediol, 1,2-butane diol, 1,3-butane diol, 1,2-pentane diol, 1,3-pentane diol, a diol of C6-C10, xylitol, maltitol, mannitol, erythritol;
   at least one of trehalose and isomalt;
   wherein the packaging composition is biodegradable in at least one environment; and,
   wherein said nonionic polysaccharide is present in about 20-70 wt % on a dry basis, said ionic polysaccharide is present in about 1-15 wt % on a dry basis, and said plasticizer is present in about 15-30 wt % on a dry basis,
   wherein the packaging composition optionally includes a functional agent, wherein said functional agent is at least one of a biocide, a clay, a nanoclay, a metal oxide, a structural enhancer, and a cross-linker.

2. The packaging composition of claim 1, wherein said functional agent is a biocide, and said biocide is at least one of an isothiazolinone, sorbic acid, potassium sorbate, benzoic acid, sodium benzoate, caprylhydroxamic acid, thymol, cavacrol, 4-isopropyl-3-methylphenol, a gallate ester, caprylyl glycol, ethyl lauroyl arginate, and a guanylhydrazone.

3. The packaging composition of claim 1, wherein said functional agent is a clay or a nanoclay and said functional agent is at least one of laponite and hectorite.

4. The packaging composition of claim 1, wherein said functional agent is a metal oxide and said metal oxide is at least one of titanium dioxide and zinc oxide.

5. The packaging composition of claim 1, wherein said functional agent is a structural enhancer and said structural enhancer is at least one of cellulose nanofiber, cellulose nanocrystals, and cellulose fibers.

6. The packaging composition of claim 1, wherein said functional agent is a cross-linker and said cross-linker is borax.

7. The packaging composition of claim 1, wherein the packaging composition is in a solid state.

8. The packaging composition of claim 7, wherein the packaging composition is biodegradable in at least one environment.

9. The packaging composition of claim 1, wherein the packaging composition is affixed to a substrate.

10. The packaging composition of claim 9, wherein the substrate is at least one of water-soluble and water dispersible.

11. The packaging composition of claim 1, wherein all of said nonionic polysaccharide, ionic polysaccharide, and plasticizer are of food grade.

12. The packaging composition of claim 1, further comprising glyceryl laurate.

13. The packaging composition of claim 1, further comprising sodium benzoate.

14. The packaging composition of claim 1, further comprising potassium sorbate.

15. A composition consisting essentially of:
a polysaccharide selected from alginate, xanthan gum, gum arabic, gum tragacanth, cationic starch, chitosan, gellan, pectin, and carrageenan;
a polysaccharide selected from the group comprising pullulan, inulin, guar, cellulose, konjac, agar, agarose, locust bean gum, tara gum, maltodextrin, dextran and curdlan;
at least one plasticizer selected from the group comprising of sorbitol, glycerin, polyethylene glycol, 1,2-propanediol, 1,3-propanediol, 1,2-butane diol, 1,3-butane diol, 1,2-pentane diol, 1,3-pentane diol, a diol of C6-C10, xylitol, maltitol, mannitol, erythritol;
at least one of trehalose and isomalt;
wherein the composition is biodegradable in at least one environment; and,
wherein a selected nonionic polysaccharide is present in about 20-70 wt % on a dry basis, a selected ionic polysaccharide is present in about 1-15 wt % on a dry basis, and said plasticizer is present in about 15-30 wt % on a dry basis.

16. The composition of claim 15, further comprising glyceryl laurate.

* * * * *